(12) United States Patent
Mukawa

(10) Patent No.: US 7,453,612 B2
(45) Date of Patent: Nov. 18, 2008

(54) OPTICAL DEVICE, AND VIRTUAL IMAGE DISPLAY

(75) Inventor: Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 156 days.

(21) Appl. No.: 11/424,338

(22) Filed: Jun. 15, 2006

(65) Prior Publication Data
US 2006/0291021 A1    Dec. 28, 2006

(30) Foreign Application Priority Data
Jun. 17, 2005   (JP)   ............................ P2005-178376

(51) Int. Cl.
*G02B 5/32* (2006.01)
*G03H 1/00* (2006.01)

(52) U.S. Cl. .......................................... 359/15; 359/34

(58) Field of Classification Search ................ 359/34
See application file for complete search history.

(56) References Cited

U.S. PATENT DOCUMENTS

| | | | | |
|---|---|---|---|---|
| 4,711,512 A | * | 12/1987 | Upatnieks ....................... | 345/7 |
| 4,863,224 A | * | 9/1989 | Afian et al. .................... | 359/15 |
| 5,537,232 A | * | 7/1996 | Biles ............................. | 359/15 |
| 5,793,504 A | * | 8/1998 | Stoll ............................ | 359/11 |
| 5,854,697 A | * | 12/1998 | Caulfield et al. .............. | 359/34 |
| 6,185,015 B1 | * | 2/2001 | Reinhorn et al. ............... | 359/15 |
| 6,704,128 B2 | * | 3/2004 | Takeyama et al. .............. | 359/15 |
| 2003/0202247 A1 | * | 10/2003 | Niv et al. ...................... | 359/569 |
| 2004/0141217 A1 | * | 7/2004 | Endo et al. .................... | 359/13 |
| 2004/0174348 A1 | * | 9/2004 | David ........................... | 345/204 |
| 2004/0246218 A1 | * | 12/2004 | Takao ........................... | 345/88 |

FOREIGN PATENT DOCUMENTS

| | | |
|---|---|---|
| JP | 8-507879 | 8/1996 |
| JP | 2002-162598 | 6/2002 |
| WO | 94/19712 | 9/1994 |

\* cited by examiner

*Primary Examiner*—Arnel C. Lavarias
*Assistant Examiner*—Jade Callaway
(74) *Attorney, Agent, or Firm*—Sonnenschein Nath & Rosenthal LLP

(57) ABSTRACT

An optical device including an optical waveguide upon which a group of parallel light beams different in traveling direction from each other are incident and from which the group of parallel light beams go out after propagated by repeated total reflection through it. The optical waveguide includes a first reflection-type volume hologram grating, and a second reflection-type volume hologram grating. The pitches of interference fringes on the hologram surfaces of the first and second reflection-type volume hologram gratings are equal to each other. In at least the second reflection-type volume hologram grating, the angle formed between the interference fringes and hologram surfaces are varied continuously or stepwise within the hologram in relation to the main incident light beam so as to meet the Bragg condition. Therefore, it is possible to reduce the unevenness of color and brightness due to angles of view.

28 Claims, 10 Drawing Sheets

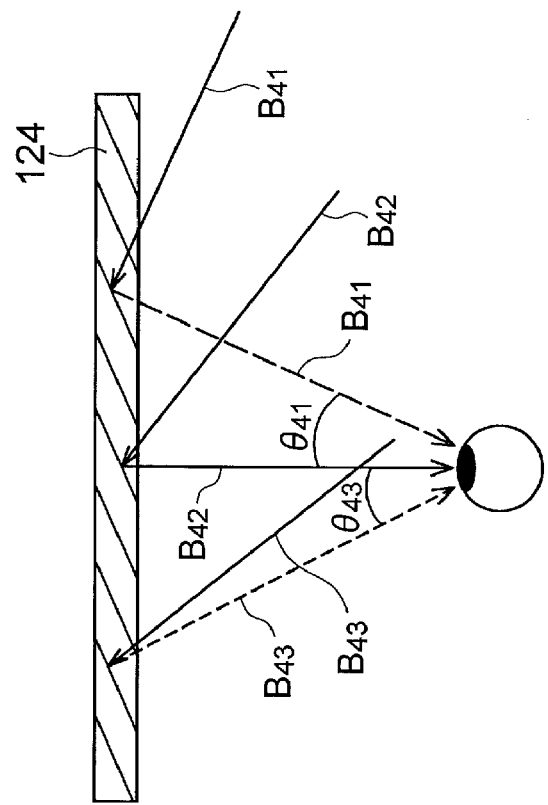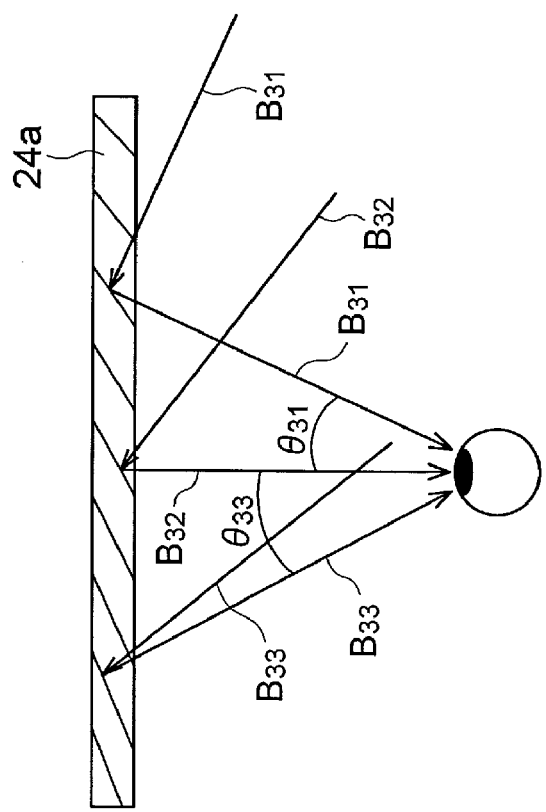

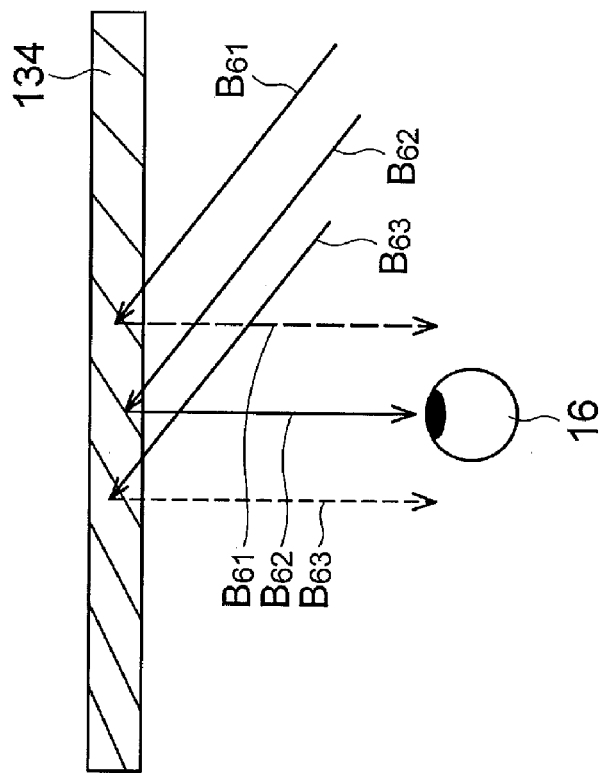
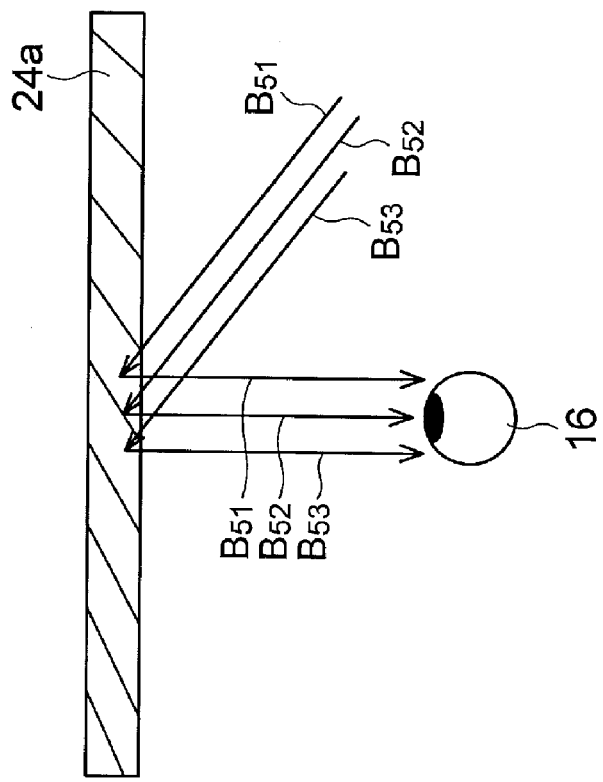
FIG.9A
FIG.9B

OPTICAL DEVICE, AND VIRTUAL IMAGE DISPLAY

CROSS REFERENCES TO RELATED APPLICATIONS

The present invention contains subject matter related to Japanese Patent Application JP 2005-178376 filed in the Japanese Patent Office on Jun. 17, 2005, the entire content of which is incorporated herein by reference.

BACKGROUND OF THE INVENTION

1. Field of the Invention

The present invention relates to a thin-type optical device that guides display-image light to a viewer's pupil, and a virtual image display including the optical device and that displays a two-dimensional image as a virtual image enlarged by a virtual image optical system to the viewer.

2. Description of the Related Art

To display a two-dimensional image as a virtual image enlarged by a virtual image optical system to the viewer, there is well known a virtual image display, generally indicated with a reference numeral 100, as shown in FIG. 1. This virtual image display 100 uses a reflection-type volume hologram grating selected from among the hologram optical elements.

As shown in FIG. 1, the virtual image display 100 includes an image display element 111 to display an image, and a virtual image optical system to receive display-image light displayed on the image display element 111 and guide it to a viewer's pupil 116.

The virtual image display element 111 is, for example, an organic EL (electroluminescence) display, inorganic EL display, liquid crystal display (LCD) or the like.

As shown, the virtual image optical system includes a collimation optical system 121, optical waveguide 122 and first and second reflection-type volume hologram gratings 123 and 124 provided on the optical waveguide 122.

The collimation optical system 121 is to receive light beams emitted from pixels of the image display element 111 and form them into a group of parallel light beams different in angle of view from each other. The group of parallel light beams emitted from the collimation optical system 121 and different in angle of view from each other is incident upon the optical waveguide 122.

The optical waveguide 122 is a thin-type parallel flat one including, as main surfaces thereof, an optical surface 122c having a light inlet 122a provided at one end thereof to receive the group of parallel light beams coming from the collimation optical system 121 and different in angle of view from each other and a light outlet 122b provided at the other end to allow the light beams go out, and an optical surface 122d opposite to the optical surface 122c.

The optical surface 122d of the optical waveguide 122 has the first reflection-type volume hologram grating 123 provided in a position opposite to the light inlet 122a of the optical surface 122c, and the second reflection-type volume hologram grating 124 provided in a position opposite to the light outlet 122b of the optical surface 122c.

FIG. 2 is a sectional view of the second reflection-type volume hologram grating 124 having interference fringes recorded thereon. As shown in FIG. 2, the second reflection-type volume hologram grating 124 has groups of interference fringes, each group including three types of interference fringes 124a, 124b and 124c of, for example, different slant angles recorded side by side at the same pitch on a hologram surface 124S thereof. With the three types of interference fringes 124a, 124b and 124c different in slant angle from each other being recorded in the second reflection-type volume hologram grating 124, light beams to be diffracted are incident, at larger angles, upon the second reflection-type volume hologram grating 124. On the second reflection-type volume hologram grating 124, the three types of interference fringes 124a, 124b and 124c slanted at angles θa, θb and θc, respectively, are recorded at the same pitch, that is, at equal pitches irrespectively of their respective positions. The first reflection-type volume hologram grating 123 is shaped symmetrically with the second reflection-type volume hologram grating 124 with respect to a plane perpendicular to the optical surface. Further, the first and second reflection-type volume hologram gratings 123 and 124 are disposed on the optical surface 122d of the optical waveguide 122 for their interference fringes to be symmetric with each other with respect to a plane perpendicular to the optical surface 122d.

The group of parallel light beams incident upon the light inlet 122a of the optical waveguide 122 and different in angle of view from each other are incident upon the first reflection-type volume hologram grating 123, and diffracted and reflected as they are. The diffracted and reflected group of parallel light beams will be propagated by repeated total reflection between the optical surfaces 122c and 122d of the optical waveguide 122 and be incident upon the second reflection-type volume hologram grating 124.

The optical waveguide 122 is designed to provide a light path having such a sufficient length and thickness (distance between the optical surfaces 122c and 122d) so that the group of parallel light beams different in angle of view and propagated by total reflection through the optical waveguide 122 will be subjected to different numbers of total reflections, respectively, depending upon their angles of view until they arrive at the second reflection-type volume hologram grating 124.

More specifically, parallel light beams of the group of parallel light beams incident upon the optical waveguide 122, that are incident being slanted toward the second reflection-type volume hologram grating 124, namely, those which are incident at large angles, will be reflected smaller numbers of times than those incident not being slanted so much toward the second reflection-type volume hologram grating 124, namely, those which are incident at small angles, because the group of parallel light beams incident upon the optical waveguide 122 are different in angle of view from each other. That is to say, since the parallel light beams of the group is incident upon the first reflection-type volume hologram grating 123 at different angles, respectively, so they are diffracted out at different angles, respectively, and thus are totally reflected at different angles, respectively. Therefore, the optical waveguides 122 may be designed sufficiently thin and long for the parallel light beams to be totally reflected different numbers of times.

The parallel light beams different in different angle of view from each other and incident upon the second reflection-type volume hologram grating 124 are diffracted and reflected so that they will not be subjected to total reflection, will be allowed to go out from the light outlet 122a of the optical waveguide 122 and be incident upon the viewer's pupil 116.

As above, the second reflection-type volume hologram grating 124 is disposed on the optical surface 122d of the optical waveguide 122 for interference fringes recorded thereon to be symmetric with those recorded on the first reflection-type volume hologram grating 123 with respect to a plane perpendicular to the optical surface. Therefore, since the group of parallel light beams reflected by the second reflection-type volume hologram grating 124 will be reflected at the same angles as angles of incidence upon the first reflection-type volume hologram grating 123, so an image will be displayed on the pupil 116 with a high resolution and without being blurred.

Including the first and second reflection-type volume hologram gratings 123 and 124 which will not work as any lens, the virtual image display 100 is able to display an image with less or no monochromatic eccentric aberration and diffraction color aberration.

However, the virtual image display 100 has incurred large unevenness of color and brightness in the past. That is, the slant angles of the interference fringes of the first and second reflection-type volume hologram gratings 123 and 124 of the virtual image display 100 are fixed in one hologram plane although the hologram layers are stacked together and slant interference fringes in each group are laid side by side in the hologram layer.

In this case, since the light beams different in angle of view from each other are incident upon the hologram at different angles so that the diffracted waves meeting the Bragg condition in different positions on the hologram are different in length from each other as shown in FIG. 3, light beams B91, B92 and B93 reflected in different positions will be diffracted with different efficiencies, respectively.

Namely, in case the light source wavelength spectrum incident upon the hologram as shown in FIG. 4 has a fixed band, the wavelength diffracted with a highest efficiency varies depending upon its angle of view, so the image will also vary in color depending upon a position in a display screen. That is, the wavelengths S91, S92 and S93 in FIG. 4 are diffracted with a highest efficiency in positions B91, B92 and B93, respectively, in FIG. 3. Therefore, in case the light source wavelength spectrum has a fixed band, the color will possibly be varied depending upon a position in a display screen. Also, in case the wavelength of light incident upon the hologram is short, the diffraction efficiency will possibly vary depending upon an angle of view and brightness will possibly be uneven.

Patent document 1: Published Japanese Translations of PCT International Publication for Patent Application No. 8-507879

Patent document 2: Japanese Patent Laid-Open No. 2002-162598

SUMMARY OF THE INVENTION

It is therefore desirable to overcome the above-mentioned drawbacks of the related art by providing an optical device and virtual image display, capable of image display with reduced the unevenness of color and brightness due to angles of view.

According to an embodiment of the present invention, there is provided an optical device including an optical waveguide upon which a group of parallel light beams different in traveling direction from each other are incident and from which the group of parallel light beams go out after propagated by repeated total reflection through it, the optical waveguide including:

a first reflection-type volume hologram grating to diffract and reflect, in the light beam-incident section thereof, the group of parallel light beams as they are so as to meet internal total reflection condition in the optical wave guide; and a second reflection-type volume hologram grating to diffract and reflect, in a section thereof from which the group of parallel light beams are to go out, the group of parallel light beams as they are so as to go out of the optical waveguide, pitches of interference fringes on the hologram surfaces of the first and second reflection-type volume hologram gratings being equal to each other;

in at least the second reflection-type volume hologram grating, the angle formed between the interference fringes and hologram surfaces being varied continuously or stepwise within the hologram in relation to the main incident light beam so as to meet the Bragg condition; and at least parts of the group of parallel light beams different in traveling direction from each other and propagated from the incident to outgoing section in the optical waveguide by repeated total reflection have different numbers of total reflection respectively depending upon the difference in traveling direction.

According to an embodiment of the present invention, there is also provided a virtual image display, including:

a light source;

a collimation optical system to form light beams emitted from the light source into parallel light beams;

a scanning optical system to scan the parallel beams; and an optical waveguide upon which a group of parallel light beams formed in the scanning optical system to travel in different directions are incident and from which the group of parallel light beams go out toward a viewer's pupil after propagated by repeated total reflection through it, wherein the optical waveguide including:

a first reflection-type volume hologram grating to diffract and reflect, in the light beams-incident section thereof, the group of parallel light beams as they are at an angle that meets the total reflection condition in the optical waveguide; and a second reflection-type volume hologram grating to diffract and reflect, in a section thereof from which the group of parallel light beams are to go out, the group of parallel light beams as they are at an angle at which they go out of the optical waveguide, pitches of interference fringes on the hologram surfaces of the first and second reflection-type volume hologram gratings being equal to each other;

in at least the second reflection-type volume hologram grating, the angle formed between the interference fringes and hologram surfaces being varied continuously or stepwise within the hologram in relation to the main incident light beam so as to meet the Bragg condition; and at least parts of the group of parallel light beams different in traveling direction from each other and propagated through the optical waveguide by repeated total reflection have different numbers of total reflections, respectively, depending upon the difference in traveling direction.

According to an embodiment of the present invention, there is also provided a virtual image display, including:

an image display element;

a collimation optical system to form light beams emitted from pixels of the image display element into parallel light beams; and an optical waveguide upon which a group of parallel light beams formed in the collimation optical system and from which the group of parallel light beams go out toward a viewer's pupil after propagated by total reflection through it, wherein the optical waveguide including:

a first reflection-type volume hologram grating to diffract and reflect, in the light beam-incident section thereof, the group of parallel light beams as they are so as to meet the internal total reflection condition in the optical waveguide; and a second reflection-type volume hologram grating to diffract and reflect, in a section thereof from which the group of parallel light beams are to go out, the group of parallel light beams as they are so as to go out of the optical waveguide, pitches of interference fringes on the hologram surfaces of the first and second reflection-type volume hologram gratings being equal to each other;

in at least the second reflection-type volume hologram grating, the angle formed between the interference fringes and hologram surfaces being varied continuously or stepwise within the hologram in relation to the main incident light beam so as to meet the Bragg condition; and at least parts of the group of parallel light beams different in traveling direction from each other and propagated from the incident to outgoing section in the optical waveguide by repeated total reflection have different numbers of total reflections, respectively, depending upon the difference in traveling direction.

In the optical device and virtual image display according to embodiments of the present invention, it is possible to reduce the unevenness of color and brightness due to angles of view by forming the angle formed between the interference fringes and hologram surfaces of at least the second reflection-type volume hologram grating at the incident side for the incident main light beams to meet the Bragg condition.

BRIEF DESCRIPTION OF THE DRAWINGS

FIG. 8 explains the relation between an inclination of interference fringes and diffraction efficiency of the reflection-type volume hologram grating, in which FIG. 8A is a sectional view of the reflection-type volume hologram grating included in the virtual image display as the embodiment of the present invention and FIG. 8B is a sectional view of a reflection-type volume hologram grating in an example compared with the embodiment of the present invention;

FIG. 9 explains the diffraction efficiency of light beams incident upon the reflection-type volume hologram grating and whose waveband is changed, in which FIG. 9A is a sectional view of the reflection-type volume hologram grating, in which the waveband is limited by a color filter or the like and FIG. 9B is a sectional view of the reflection-type volume hologram grating, in which the waveband is not limited.

DETAILED DESCRIPTION OF THE PREFERRED EMBODIMENTS

The present invention will be described in detail below concerning an optical device and virtual image display as embodiments thereof with reference to the accompanying drawings.

Figure 1:
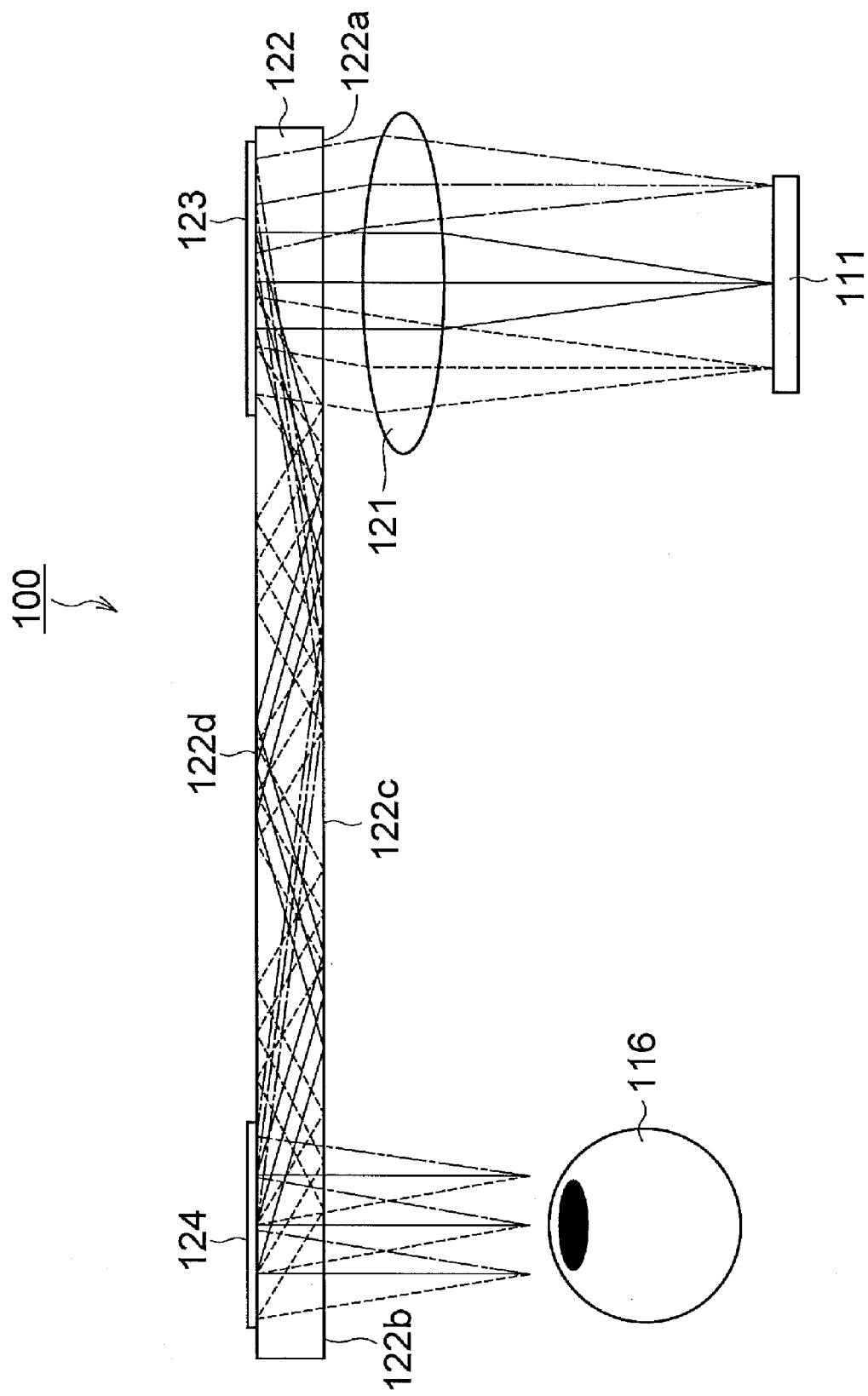
FIG. 1 is a sectional view of a virtual image display that is used in the past.
Figure 2:
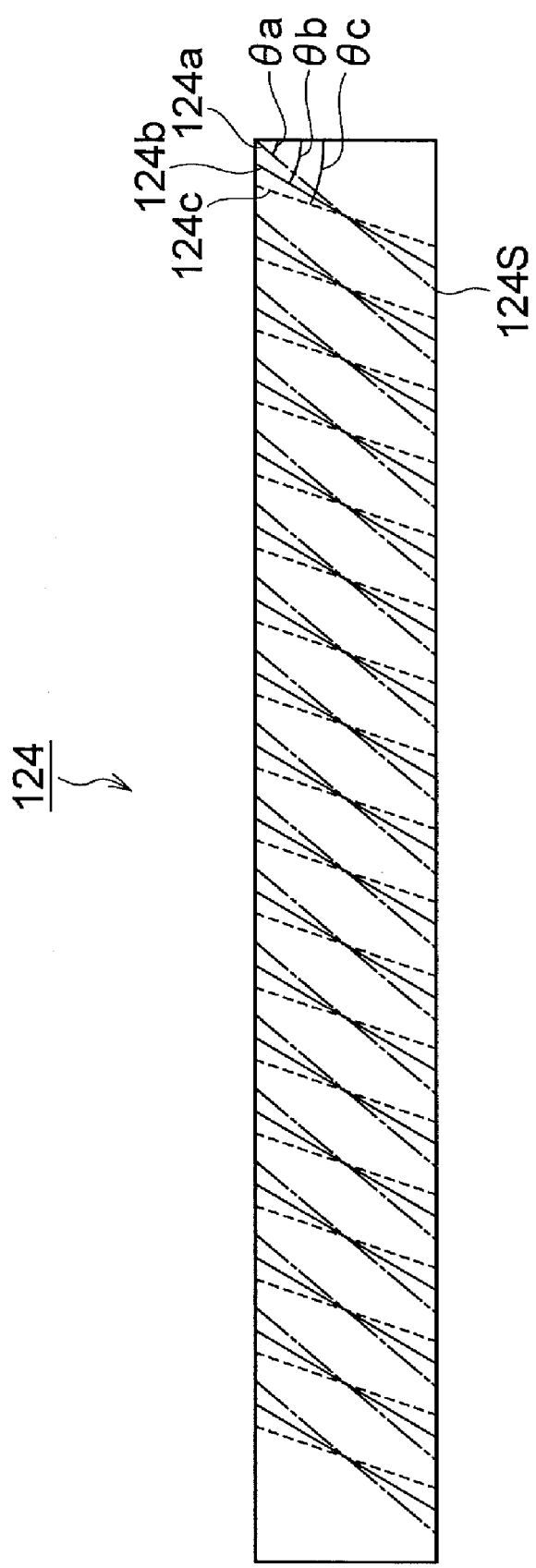
FIG. 2 is also a sectional view of the reflection-type volume hologram grating included in the virtual image display used in the past.
Figure 3:
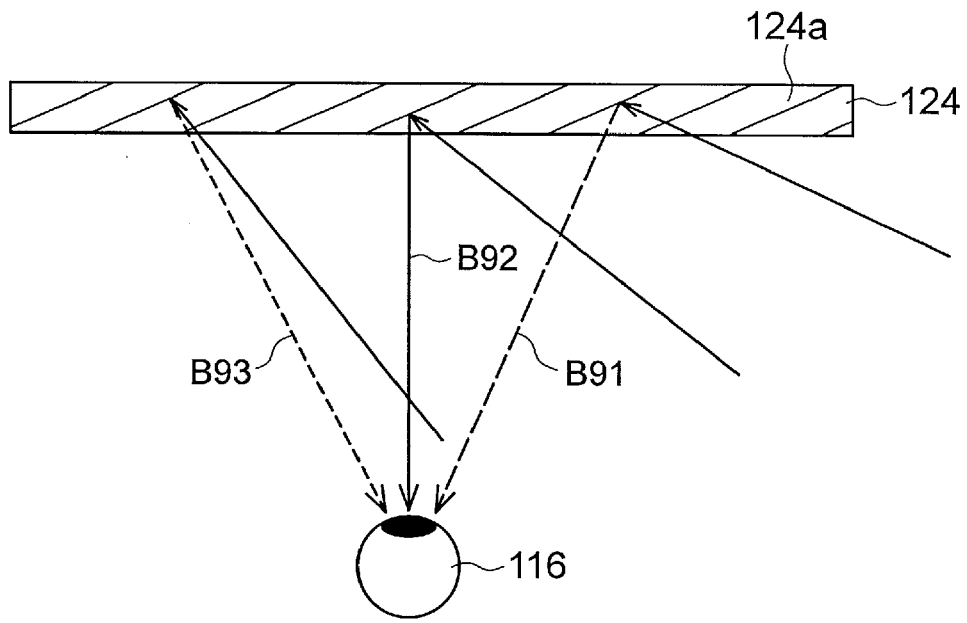
FIG. 3 is a sectional view, showing incidence of light beams at different angles of view upon the reflection-type volume hologram grating included in the virtual image display used in the past.
Figure 4:
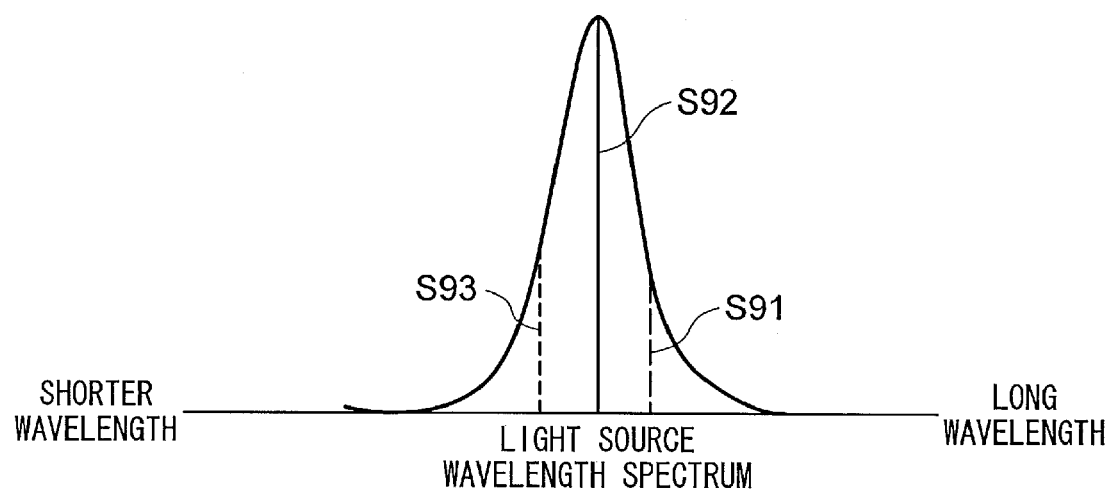
FIG. 4 shows a waveform spectrum of illumination light emitted from an illumination light source included in the virtual image display.
Figure 5:
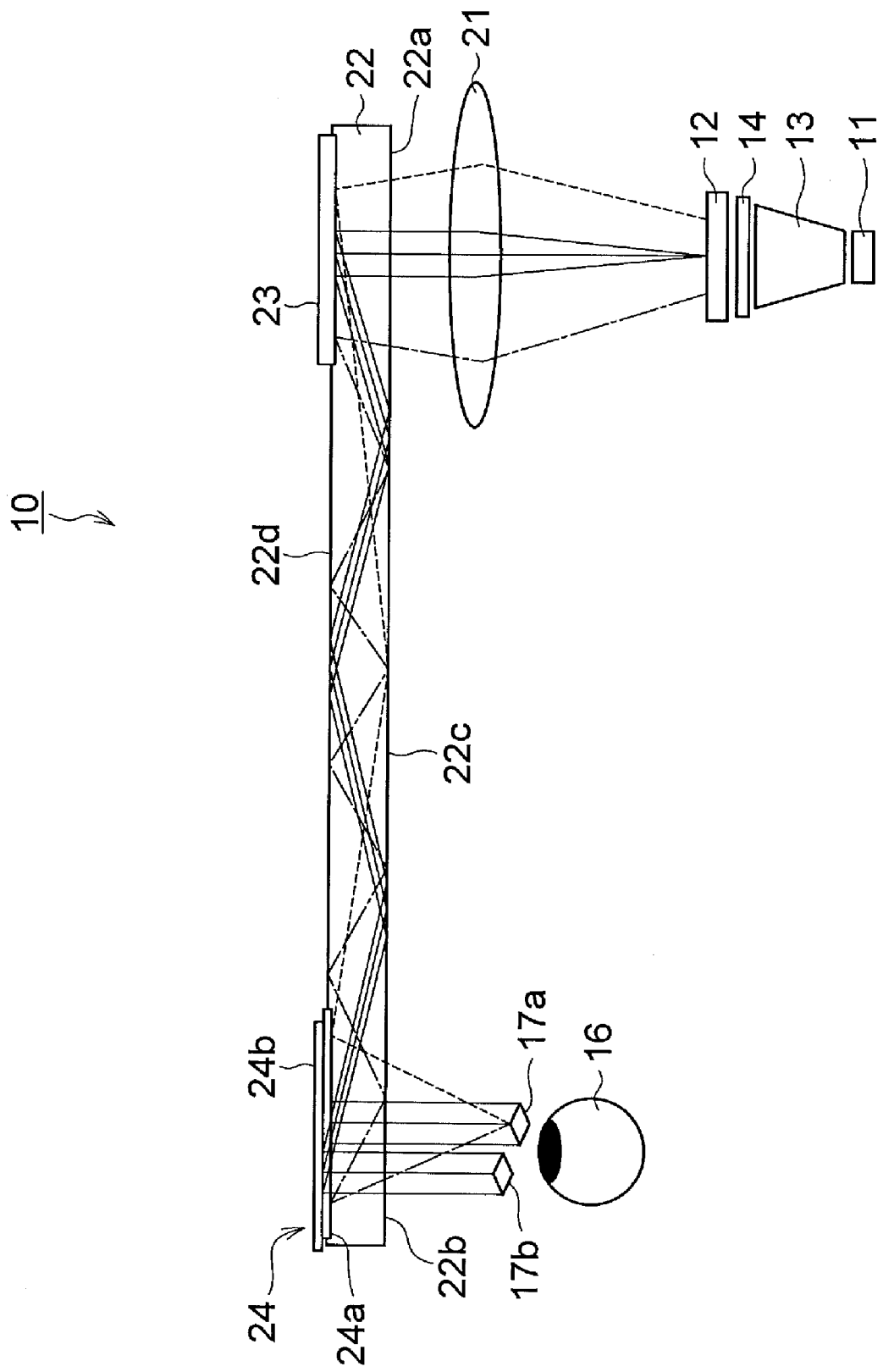
FIG. 5 is a sectional view of a virtual image display as an embodiment of the present invention.

Referring now to FIG. 5, there is illustrated in the form of a schematic sectional view the optical device as the embodiment of the present invention. As shown, the optical device, generally indicated with a reference numeral 10, includes an illumination light source 11 to emit illumination light, spatial modulation element 12 to make spatial modulation of the illumination light coming from the illumination light source 11, and a virtual image optical system to receive the illumination light having been subjected to the spatial modulation in the spatial modulation element 12 and guide the light to the viewer's pupil 16.

Between the illumination light source 11 and spatial modulation element 12, there are provided a light pipe 13 to transmit the illumination light emitted from the illumination light source 11 and a color filter 14 to allow only the illumination light having a specific wavelength to pass by.

The spatial modulation element 12 is, for example, a transmission type liquid crystal display (LCD) which will make spatial modulation of the incident illumination light pixel by pixel. The spatial-modulation illumination light will be incident upon the virtual image optical system. That is, the spatial modulation element 12 functions as a scanning optical system capable of scanning parallel light in the plane of the inlet surface of the optical waveguide by making the spatial modulation of the illumination light.

Note that although the virtual image display 10 according to this embodiment includes the illumination light source 11 and spatial modulation element 12 but, it may include, for example, an image display element such as an organic EL (electroluminescence) display, inorganic EL display, liquid crystal display (LCD) or the like in place of the illumination light source 11 and spatial modulation element 12.

The color filter 14 limits the waveband of the light beams allowed to be incident upon a second reflection-type volume hologram grating so that the diameter of a field viewable by the viewer will be less than 2 mm. According to this embodiment, the color filter 14 limits the waveband to, for example, about 10 nm.

The virtual optical system includes a collimation optical system 21, optical waveguide 22, first reflection-type volume hologram grating 23 provided on the optical waveguide 22 and a second reflection-type volume hologram grating 24.

The collimation optical system 21 receives the illumination light having been subjected to the spatial modulation in the spatial modulation element 12 and allows a group of parallel light beams different in angle of view from each other to go out. The group of parallel light beams emitted from the collimation optical system 21 and different in angle of view from each other is incident upon the optical waveguide 22.

The optical waveguide 22 has a thin parallel flat structure including, as main sides thereof, a first optical surface 22c having at one end thereof a light inlet 22a upon which the group of parallel light beams coming from the collimation optical system 21 are incident, and at the other end a light outlet 22b to allow the group of parallel light beams to go out, and a second optical surface 22d disposed opposite to the first optical surface 22c.

The second optical surface 22d of the optical waveguide 22 has the first reflection-type volume hologram grating 23 provided in a position opposite to the light inlet 22a of the first optical surface 22c and the second reflection-type volume hologram grating 24 provided in a position opposite to the light outlet 22b of the first optical surface 22c.

The first and second reflection-type volume hologram gratings 23 and 24 are disposed in parallel with the total-reflection surface of the optical waveguide 22. The first reflection-type volume hologram grating 23 is to diffract and reflect the group of parallel light beams as they are in a light-incident area thereof where the group of parallel light beams is incident, inside the optical waveguide 22 and at an angle meeting the internal total-reflection condition. The second reflection-type volume hologram grating 24 is to diffract and reflect the group of parallel light beams as they are in an outgoing area thereof where the group of parallel light beams propagated by repeated total reflection through the optical waveguide 22 and at an angle at which the group of parallel light beams are allowed to go out of the optical waveguide 22.

Figure 6:
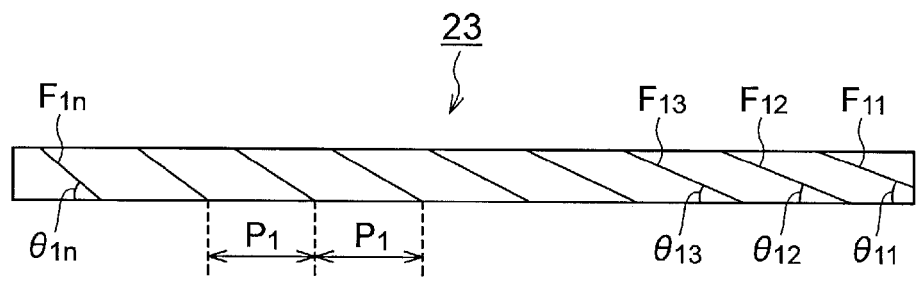
FIG. 6 is also a sectional view of a first reflection-type volume hologram grating included in the virtual image display and optical device as the embodiment of the present invention.
Figure 7:
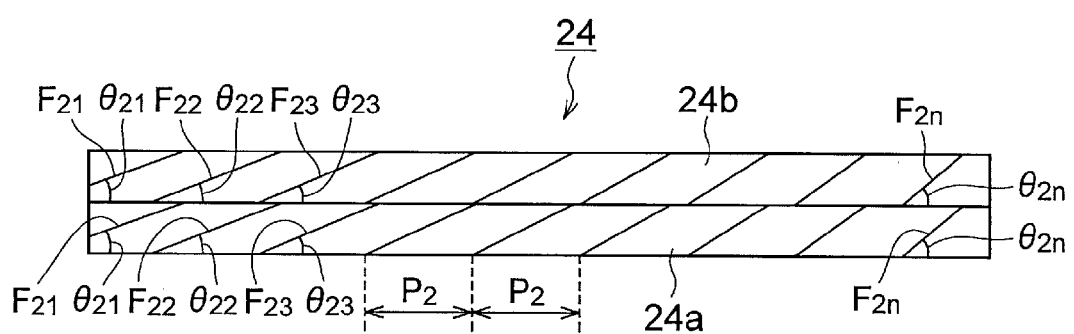
FIG. 7 is also a sectional view of a second reflection-type volume hologram grating included in the virtual image display and optical device as the embodiment of the present invention.

FIGS. 6 and 7 are sectional views of the first and second reflection-type volume hologram gratings 23 and 24, respectively. As shown in FIGS. 6 and 7, the interference fringes are laid on the hologram surface of the first reflection-type volume hologram grating 23 with the same pitch as that with which the interference fringes are laid on the hologram surface of the second reflection-type volume hologram grating 24. More particularly, the pitches P1 and P2 of the interference fringes on the hologram surface, which will diffract light beams having nearly equal wavelengths, of the first and second reflection-type volume hologram gratings 23 and 24 are equal to each other.

In the first reflection-type volume hologram grating 23, interference fringes $F_{11}, F_{12}, F_{13}, \ldots, F_{1n}$ are formed at slant angles $\theta_{11}, \theta_{12}, \theta_{13}, \ldots \theta_{1n}$ they form with the hologram surface, the slant angles being continuously vary within the hologram to meet the Bragg condition as shown in FIG. 6.

As shown in FIG. 7, the second reflection-type volume hologram interference 24 is formed, by stacking, from a plurality of hologram layers 24a and 24b which diffract mainly light beams incident at the same angle in the same position and having different wavelengths, respectively, at nearly equal angles. That is, in the second reflection-type volume hologram grating 24, the hologram layers 24a and 24b having interference fringes equal to each other are stacked one on the other with the interference fringes being staggered from each other in a direction perpendicular to the interference fringes in the hologram surface.

In each of the hologram layers 24a and 24b of the second reflection-type volume hologram grating 24, interference fringes $F_{21}, F_{22}, F_{23}, \ldots, F_{2n}$ are formed at slant angles $\theta_{21}, \theta_{22}, \theta_{23}, \ldots, \theta_{2n}$, they form with the hologram surface, the slant angles being continuously vary within the hologram to meet the Bragg condition as in the first reflection-type volume hologram grating 23.

That is to say, the first and second reflection-type volume hologram gratings 23 and 24 have the interference fringes $F_{11}, F_{12}, F_{13}, \ldots, F_{1n}$, and $F_{21}, F_{22}, F_{23}, \ldots, F_{2n}$, formed on their respective hologram surfaces at angles varying from one position to another.

Also, the hologram layers 24a and 24b of the second reflection-type volume hologram grating 24 are symmetric with the first reflection-type volume hologram grating 23 with respect to a plane perpendicular to the first and second optical surfaces 22c and 22d of the optical waveguide 22.

Also, the slant angles $\theta_{11}, \theta_{12}, \theta_{13}, \ldots, \theta_{1n}$ of the interference fringes of the first reflection-type volume hologram grating 23 are formed to increase as the latter is nearer to the second reflection-type volume hologram grating 24, which is expressed with $\theta_{11} < \theta_{12} < \theta_{13} < \ldots < \theta_{1n}$.

Further, the slant angles $\theta_{21}, \theta_{22}, \theta_{23}, \ldots, \theta_{2n}$ of the interference fringes of the second reflection-type volume hologram grating 24 are formed to increase as the latter is nearer to the first reflection-type volume hologram grating 23, which is expressed with $\theta_{21} < \theta_{22} < \theta_{23} < \ldots < \theta_{2n}$.

Since the slant angles $\theta_{11}, \theta_{12}, \theta_{13}, \ldots, \theta_{1n}$ and $\theta_{21}, \theta_{22}, \theta_{23}, \ldots, \theta_{22n}$ of the first and second reflection-type volume hologram gratings 23 and 24 are varied to meet the Bragg condition, the diffraction efficiencies corresponding to the angles of view may be equalized to each other, which permits to eliminate the uneven brightness.

Note here that although the slant angles of the interference fringes of the first and second reflection-type volume hologram gratings 23 and 24 are continuously varied within the hologram, the present invention is not limited to such a continuous variation of the slant angles but the slant angles may be stepwise varied.

Also, although the slant angles of the interference fringes of both the first and second reflection-type volume hologram gratings 23 and 24 are continuously varied, the present invention is not limited to such a continuous variation of the slant angles but the slant angle of the interference fringes of at least the second reflection-type volume hologram fringe 24 may be varied continuously or stepwise.

By varying the slant angles of the interference fringes of the first and second reflection-type volume hologram gratings 23 and 24 as above, it is possible to equalize the diffraction efficiencies corresponding to the angles of view and solve the problem of uneven brightness as will be explained herebelow with reference to FIG. 8.

FIG. 8A shows one (24a) of the holograms of the aforementioned second reflection-type volume hologram grating 24. It should be noted herein that since the other hologram 24b is similar to the one hologram layer 24a and the first reflection-type volume hologram grating 23 is similar to the second one except that it is symmetric with the second one with respect to the plane perpendicular to the first and second optical surfaces 22c and 22d of the optical waveguide 22, the other hologram layer 24b will not be explained. FIG. 8B shows a reflection-type volume hologram grating 124 as a comparative example for comparison with the above embodiment of the present invention. In the reflection-type volume hologram grating 124 shown in FIG. 8B, the interference fringes are laid at the same pitch and each of the slant angles of the interference fringes is a fixed one.

In the hologram layer 24a of the second reflection-type volume hologram grating 24, since the slant angles of the interference fringes are continuously varied as shown in FIG. 8A, so the diffraction efficiencies of the light beams $B_{41}$, $B_{42}$ and $B_{43}$ may be equalized to each other not depending upon the angles of view $\theta_{41}$, $\theta_{42}$ and $\theta_{43}$, respectively. It should be noted that the angle of view $\theta_{42}$ in FIG. 8A is 0 deg.

On the other hand, in the comparative reflection-type volume hologram grating 124, since the slant angles of the interference fringes are fixed as shown in FIG. 8B, so the diffraction efficiencies of the light beams $B_{41}$, $B_{42}$ and $B_{43}$ are different from each other, resulting in an uneven color and brightness. It should be noted that the angle of view $\theta_{42}$ in FIG. 8B is 0 deg.

As above, the first and second reflection-type volume hologram gratings 23 and 24 are formed for the slant angles of the interference fringes to meet the Bragg condition as shown in FIGS. 8A and 8B, and thus the diffraction efficiencies corresponding to the angles of view may be equalized to each other and the problem of uneven brightness can be solved.

That is to say, by varying the slants of the interference fringes, within the hologram surfaces to diffract and reflect the light beams having different angles of view, in the first and second reflection-type volume hologram gratings 23 and 24, correspondingly to the positions of the interference fringes, it is possible to solve the problem of the uneven color and brightness on the screen.

Also, in the virtual image display 10, since the waveband of the light beams allowed to arrive at the observer's pupil 16 is limited by the aforementioned color filter 14, so it is possible to prevent the color from being uneven within the diameter of exit pupil because the slant angles of the interference fringes of the first and second reflection-type volume hologram gratings 23 and 24 are varied as above.

The uneven color within the diameter of exit pupil can be prevented by limiting the waveband of the light beams by the color filter 14 as will be explained herebelow with reference to FIG. 9.

FIG. 9A shows the limited waveband of the light beams allowed to arrive at the one hologram 24a of the holograms of the aforementioned second reflection-type volume hologram grating 24. It should be noted herein that since the waveband of the light beams allowed to arrive at the other hologram 24b is limited similarly to that of the light beams allowed to arrive at the one hologram layer 24a and the first reflection-type volume hologram grating 23 is similar to the second one except that it is symmetric with the second one with respect to the plane perpendicular to the first and second optical surfaces 22c and 22d of the optical waveguide 22, the limitation of the waveband of the light beams allowed to arrive at the other hologram layer 24b will not be explained. FIG. 9B shows a reflection-type volume hologram grating 134 of a virtual image display as a comparative example for comparison with the above embodiment of the present invention. In the reflection-type volume hologram grating 134 shown in FIG. 9B, the interference fringes and their slant angles are similar to those of the hologram layer 24a and the waveband of the light beams allowed to arrive at this reflection-type volume hologram grating 134 is not limited.

In the comparative virtual image display shown in FIG. 9B, since no color filter is provided, the waveband of the arriving light beams is wide, and since the slant angles of the interference fringes of the reflection-type volume hologram grating 134 are varied so that the diffraction efficiencies are different from each other correspondingly to different wavelengths of light beams $B_{61}$, $B_{62}$ and $B_{63}$, so the color becomes uneven in some positions within the diameter of exit pupil.

On the other hand, in the virtual image display as the embodiment of the present invention shown in FIG. 9A, since the waveband of the light beams allowed to be incident upon the second reflection-type volume hologram grating 24 is limited by the color filter 14, the difference between the diffraction efficiencies is small correspondingly to the wavelengths of the light beams B51, B52 and B53 of different wavelengths even if the slant angles of the interference fringes of the hologram layer 24a are continuously varied, the color is prevented from becoming uneven in some positions within the diameter of exit pupil, and the diffraction efficiencies corresponding to the angles of view are equalized to each other.

Note here that although the waveband of the light beams allowed to be incident upon the pupil is limited by the color filter 14 in the aforementioned embodiment, an illumination light source sufficiently small in emission spectrum may be used instead of such limitation of the waveband.

In the virtual image display 10, since the waveband of the light beams allowed to arrive at the viewer's pupil 16 is limited by the color filter 14 and the slant angles of the interference fringes in the first and second reflection-type volume hologram gratings 23 and 24 are varied as shown in FIGS. 9A and 9B, as above, it is possible to equalize the diffraction angles corresponding to the angles of view to each other and prevent the color from being uneven within the diameter of exit pupil.

Also, in the second reflection-type volume hologram grating 24, since the light beams are incident at the same angle upon the same incident position and the plurality of hologram layers 24a and 24b to diffract the light beams of different wavelengths mainly at the same angle are stacked, a part of the group of parallel light beams propagated through the optical waveguide 22 are diffracted and reflected more than twice and a part of the light is allowed to go out of the optical waveguide 22 at each time of diffraction.

That is to say, the second reflection-type volume hologram grating 24 permits to allow the light beams having been propagated through the optical waveguide 22 to go out twice from the latter as shown in FIG. 5, and thus two viewable regions 17a and 17b may be formed.

In the virtual image display 10, since the second reflection-type volume hologram grating 24 is capable of forming the two viewable regions 17a and 17b, it is possible to form the viewable regions relatively wide by appropriately adjusting the distance between the two viewable regions 17a and 17b so that only the rays of light incident upon one of the viewable regions all the time will be incident upon the viewer's pupil.

For example, in the virtual image display 10 with the viewable regions being formed to have a width of less than 2 mm by adjusting the distance between the viewable regions to about 2 mm, even a viewer whose lens is low in function of lens adjustment or who incurs aberration is able to clearly recognize a virtual image, and a viewer having a good visual performance is able to easily observe a virtual image with less fatigue because the eye focusing is not necessary.

In the virtual image display 10 constructed as above, a group of parallel light beams incident upon the light inlet 22a of the optical guide 22 and different in angle of view from each other are incident upon the aforementioned first reflection-type volume hologram grating 23 which will diffract and reflect the group of parallel light beams as they are. The group of parallel light beams thus diffracted and reflected will be propagated by repeated total reflection between the first and second optical surfaces 22c and 22d of the optical waveguide 22 and be incident upon the aforementioned second reflection-type volume hologram grating 24.

The group of parallel light beams traveling in different directions and propagated by repeated total reflection from the incident to outgoing section of the optical waveguide 22 have at least a part thereof subjected to a different number of total reflections from that to which the other part is subjected because of the difference in traveling direction between the one and other parts.

That is, the optical waveguide 22 is designed to have such a length and thickness between the first and second optical surfaces 22c and 22d thereof that the parallel light beams of difference angles of view, propagated by repeated total reflection through the optical waveguide 22 by total reflections repeated different numbers of times, respectively, depending upon their angles of view until they arrive at the second reflection-type volume hologram grating 24.

More specifically, the parallel light beams, incident being slanted toward the second reflection-type volume hologram grating 24, of the group of parallel light beams incident upon the optical waveguide 22, that is, the parallel light beams incident at a large angle, are reflected smaller number of times than the parallel light beams, incident being not so much slanted toward the second reflection-type volume hologram grating 24, that is, the parallel light beams incident at a small angle, because the group of parallel light beams are incident, as parallel light beams different in angle of view from each other, upon the optical waveguide 22. Namely, since the parallel light beams are incident at different angles upon the first reflection-type volume hologram grating 23, so they are allowed to go out at different angles of diffraction, respectively, and hence the parallel light beams are totally reflected at different angles. Thus, with the optical waveguide 22 being designed thin and sufficiently long, the parallel light beams will be totally reflected different numbers of times, respectively.

The group of parallel light beams different in angle of view, incident upon the second reflection-type volume hologram grating 24, are diffracted and reflected not to be totally reflected, are allowed to go out from the light outlet 22d of the optical waveguide 22 and are incident upon the viewer's pupil 16.

As above, the second reflection-type volume hologram grating 24 is disposed on the optical surface 22d of the optical waveguide 22 for the interference fringes recorded thereon to be symmetric with those on the first reflection-type volume hologram grating 23 with respect to a plane perpendicular to the first and second optical surfaces 22c and 22d of the optical waveguide 22. Therefore, since the group of parallel light beams reflected by the second reflection-type volume hologram grating 24 will be reflected at angles equal to angles of incidence upon the first reflection-type volume hologram grating 23, an image will be displayed on the pupil 16 with a high resolution and without being blurred.

Note that although the first and second reflection-type volume hologram gratings 23 and 24 are disposed for their hologram surfaces to be parallel with the first and second optical surfaces 22c and 22d of the optical waveguide 22, the present invention is not limited to this arrangement but they may be disposed for the hologram surfaces to form a predetermined angle with the first and second optical surfaces 22c and 22d, respectively.

Since the virtual image display 10 as the embodiment of the present invention is constructed so that the slant angles of the interference fringes of at least the second reflection-type volume hologram grating 24 meet the Bragg condition with respect to the main ray of light and central wavelength at each angle of view, it is possible to reduce the unevenness of color and brightness due to the angles of view.

Also, in the virtual image display 10 as the embodiment of the present invention, since the waveband is limited by the color filter 14, so it is possible to prevent the color unevenness due to the variation in slant angle of the interference fringes.

Further, the virtual image display 10 as the embodiment of the present invention is constructed so that at least one of the first and second reflection-type volume hologram gratings 23 and 24 is formed, by stacking, from a plurality of hologram layers that diffract mainly light beams incident at the same angle in the same position and having different wavelengths, respectively, at nearly equal angles. So, it is possible to allow the light beams having been propagated through the optical waveguide 22 to go out of the latter and form two viewable regions 17a and 17b. By appropriately adjusting the distance between the two viewable regions 17a and 17b, it is possible to form the viewable regions relatively wide and allows only the rays of light incident upon one of the viewable regions all the time to be incident upon the viewer's pupil. That is, with the virtual image display 10 as the embodiment of the present invention, even a viewer whose lens is low in function of lens adjustment or incurs aberration is able to clearly recognize a virtual image, and a viewer having a good visual performance is able to easily observe a virtual image with less fatigue.

Figure 10:
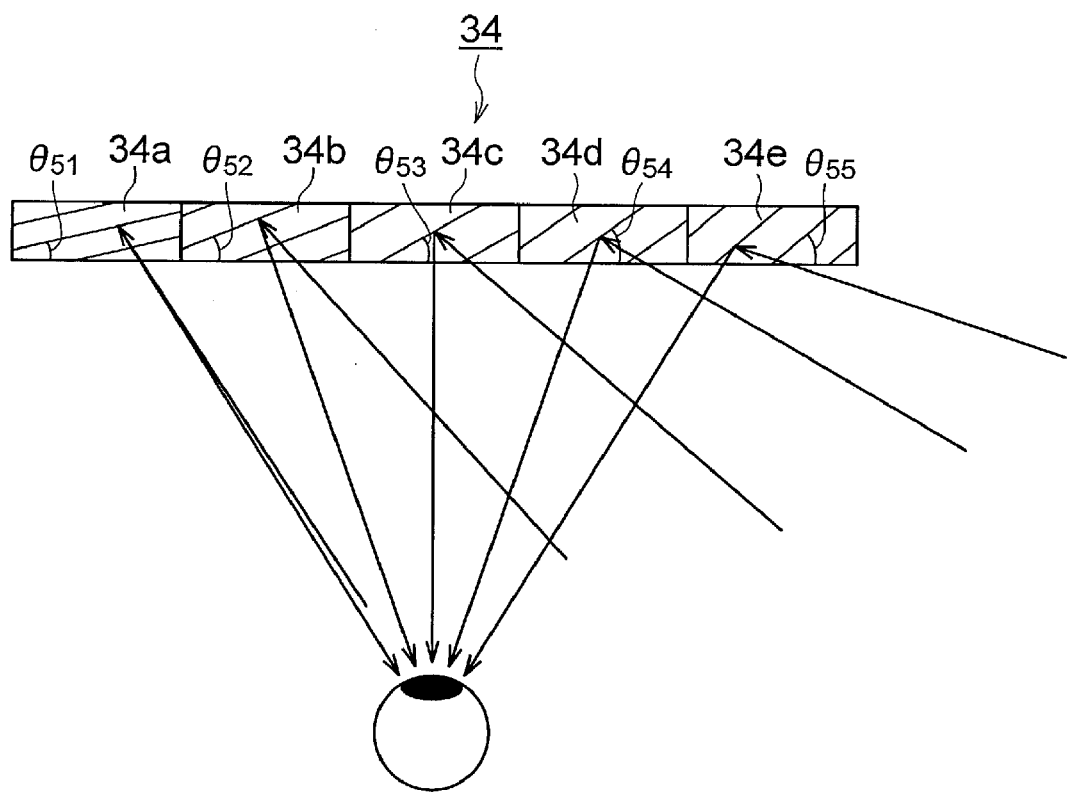
FIG. 10 is a sectional view of another example of the reflection-type volume hologram grating included in the virtual image display as the embodiment of the present invention.

Note that although the first and second reflection-type volume hologram gratings 23 and 24 are constructed for the slant angles of the interference fringes to be continuously varied within the hologram, they are not limited to this arrangement but they may be formed from a plurality of sections having the same slant angle within them as shown in FIG. 10.

That is, as shown in FIG. 10, a second reflection-type volume hologram grating 34 is formed from first to fifth longitudinally extending sections 34a, 34b, 34c, 34d and 34e, the surface pitches on the hologram planes in all the sections are equal to each other, and slant angles $\theta 51$, $\theta 52$, $\theta 53$, $\theta 54$ and $\theta 55$ in the sections are equal to each other and increased in an ascending order like $\theta 51 < \theta 52 < \theta 53 < \theta 54 < \theta 55$ as they are nearer to a first reflection-type volume hologram grating. Also, the slant angles $\theta 51$, $\theta 52$, $\theta 53$, $\theta 54$ and $\theta 55$ are determined to meet the Bragg condition.

With the reflection-type volume hologram grating 34 shown in FIG. 10, it is possible to equalize the diffraction efficiencies corresponding to angles of view to each other, whereby it is possible to solve the problem of the brightness unevenness as in the aforementioned first and second reflection-type volume hologram gratings 23 and 24. It should be noted here that the second reflection-type volume hologram grating 34 having been illustrated and described as an example is similar to the first reflection-type volume hologram granting except that it is disposed symmetrically to a plane perpendicular to the first and second optical surfaces 22c and 22d of the optical waveguide 22.

As having been illustrated and described above, the second reflection-type volume hologram grating 24 is formed, by stacking, from a plurality of hologram layers 24a and 24b. However, the present invention is not limited to this arrangement but at least one of the first and second reflection-type volume hologram gratings 23 and 24 may be formed, by stacking, from a plurality of hologram layers which diffract mainly light beams incident at the same angle in the same position and having different wavelengths, respectively, at nearly equal angles.

Also, as having been illustrated and described above, the second reflection-type volume hologram grating 24 is formed, by stacking, from a plurality of hologram layers 24a and 24b. However, the present invention is not limited to this arrangement but at least one of the first and second reflection-type volume hologram gratings 23 and 24 may be formed, by side-by-side laying, from a plurality of slant interference fringes which diffract mainly light beams incident at the same angle in the same position and having different wavelengths, respectively, at nearly equal angles, for example.

Figure 11:
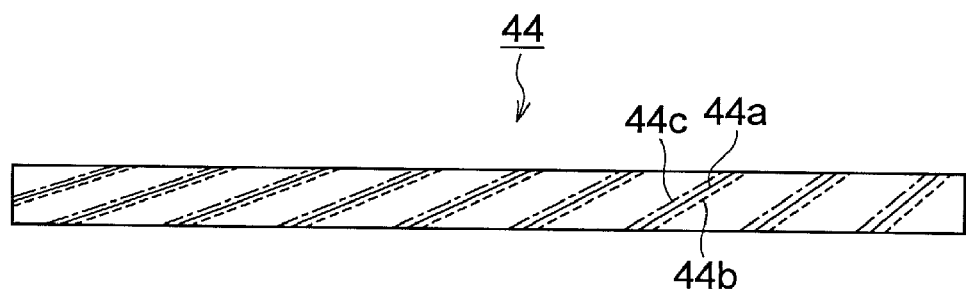
FIG. 11 is a sectional view of still another example of the reflection-type volume hologram grating included in the virtual image display as the embodiment of the present invention.

For example, a second reflection-type volume hologram grating 44 as shown in FIG. 11 may be used. The second reflection-type volume hologram grating 44 includes a first to third interference fringes 44a, 44b and 44c whose interference fringes are laid at the same pitch. The first to third interference fringes 44a to 44c diffract light beams having the same wavelength. The second reflection-type volume hologram grating 44 is formed, by side-by-side laying, from the first to third slant interference fringes 44a to 44c equal to each other and staggered from each other in a direction perpendicular to the interference fringes on the hologram surface.

Also, the slant angles of these interference fringes 44a to 44c are continuously varied within the hologram to meet the Bragg condition similarly to the interference fringes formed in the hologram layer 24a of the aforementioned second reflection-type volume hologram grating 24.

With the second reflection-type volume hologram grating 44 shown in FIG. 11, it is possible to equalize the diffraction efficiencies corresponding to angles of view to each other, thereby solving the problem of the uneven brightness as in the aforementioned first and second reflection-type volume hologram gratings 23 and 24. It should be noted here that the second reflection-type volume hologram grating 44 having been illustrated and described as an example is similar to the first reflection-type volume hologram granting except that it is disposed symmetrically to a plane perpendicular to the first and second optical surfaces 22c and 22d of the optical waveguide 22.

Also, the present invention is not limited to the above arrangement but at least one of the first and second reflection-type volume hologram gratings 23 and 24 may be formed, by stacking, from a plurality of hologram layers which diffract mainly light beams incident at the same angle in the same position and having the same wavelength at the same angle.

Also, the present invention is not limited to the above arrangements but at least one of the first and second reflection-type volume hologram gratings 23 and 24 may be formed, by side-by-side laying, from a plurality of slant interference fringes which diffract mainly light beams incident at the same angle in the same position and having the same wavelength at the same angle, for example.

Figure 12:
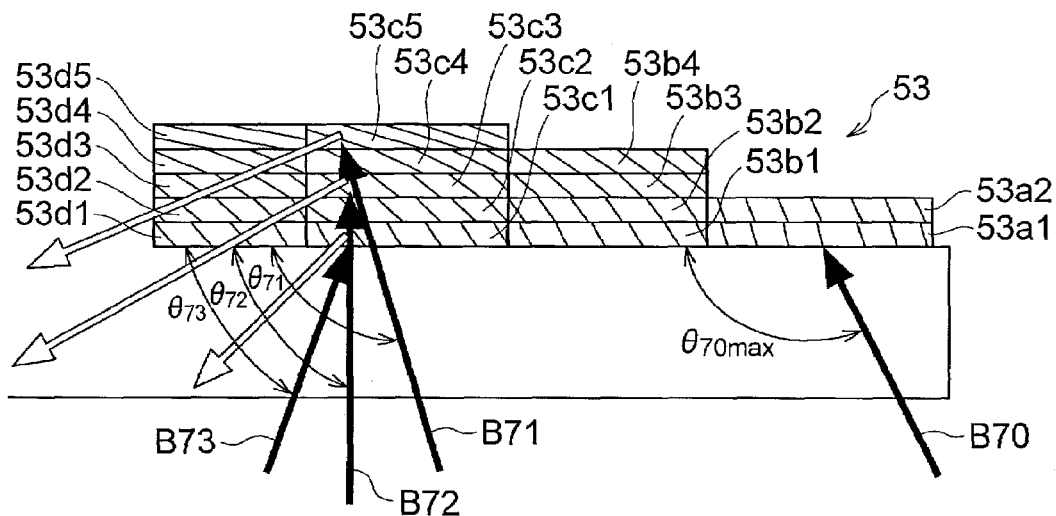
FIG. 12 is a sectional view of an embodiment of the present invention in which the reflection-type volume hologram grating is formed from a plurality of sections different in number of stacked hologram layers or side-by-side laid interference fringes in each hologram layer from each other.

Also, the first reflection-type volume hologram grating provided at the incident side may be formed from by stacking or lapping, from stacked hologram layers or side-by-side laid interference fringes, of which the number is varied in a direction perpendicular to the interference fringe on the surface as shown in FIG. 12.

FIG. 12 shows a first reflection-type volume hologram grating 53 formed from interference fringes, the number of which is increased in a direction in which the hologram grating 53 is nearer to the second reflection-type volume hologram grating 24. The first reflection-type volume hologram grating 53 diffracts parallel light beams coming from the collimation optical system, incident at a plurality of angles and having a desired wavelength. The slant angles of the interference fringes of the first reflection-type volume hologram grating 53 are continuously varied within the hologram to meet the Bragg condition similarly to the interference fringes of the aforementioned first reflection-type volume hologram grating 23.

Figure 13:
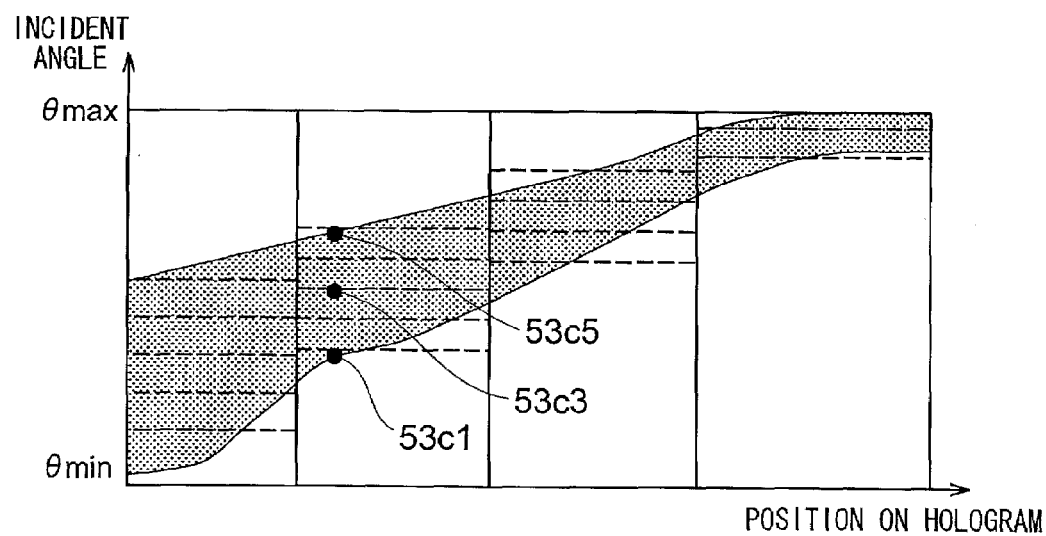
FIG. 13 is a sectional view, enlarged in scale, showing a distribution of incident light upon the hologram of the reflection-type volume hologram grating shown in FIG. 12.

At this time, the distribution of the incident angles of the light beams to be diffracted in the hologram varies from one position to another as shown in FIG. 13. It should be noted that in FIG. 13, the horizontal axis indicates the position on the hologram and vertical axis indicates the distribution of incident angles of the light beams to be diffracted in a position on the hologram. As shown in FIG. 12, the incident-side hologram is divided into rectangular regions in a direction perpendicular to the interference fringe on the surface thereof, the number of interference fringes in the stacked hologram layers is varied from one region to another and slant angles of the interference fringes in the stacked hologram layers are varied from each other. For example, the incident-side hologram is divided into four regions 53a, 53b, 53c and 53d in the direction perpendicular to the interference fringe on the surface thereof. The region 53a is formed from a stack of hologram layers 53a1 and 53a2, region 53b is formed from a stack of hologram layers 53b1, 53b2, 53b3 and 53b4, region 53c is formed from a stack of hologram layers 53c1, 53c2, 53c3, 53c4 and 53c5, and the region 53d is formed from a stack of hologram layers 53d1, 53d2, 53d3, 53d4 and 53d5. The slant angles of the interference fringes in the regions are different from each other. It should be noted that the interference fringes on the hologram surface are all the same for the light beams having the same wavelength. In this case, the slant angles of the interference fringes, nearer to the viewer's pupil, are smaller.

As will be known from the distribution of incident angles of the light beams to be diffracted as shown in FIG. 13, a light beam B70 whose incident angle is θ70 max which is the largest has to be diffracted in the region 53a farthest from the viewer's pupil and light beams B71, B72 and B73 incident at θ71, θ72 and θ73, respectively, have to be diffracted in the region 53c. Also, in the same region 53c, the light beams B71, B72 and B73 larger in incident angle in this order like θ71>θ72>θ73 are diffracted in the hologram layers 53c5, 53c3 and 53c1, respectively, farther in this order from the hologram surface.

In the foregoing, there have been described examples in which the number of interference fringes laid side by side in the first reflection-type volume hologram grating is increased in the direction away from the second reflection-type volume hologram grating 24. However, the number of stacked interference fringes may be increased in a direction toward the second reflection-type volume hologram grating 24.

With the first reflection-type volume hologram grating 53, it is possible to equalize the diffraction efficiencies corresponding to angles of view to each other, thereby solving the problem of the uneven brightness as in the aforementioned first and second reflection-type volume hologram gratings 23 and 24. Also, the incident-side first reflection-type volume hologram grating 53 is divided into regions and the number of stacked hologram layers or interference fringes laid side by side in each hologram layer is varied from one region to another as shown in FIGS. 12 and 13, whereby it is possible to reduce the distance over which the light beams are propagated through the hologram medium as much as possible. Thus, it is possible to reduce even a little influence on reproduced light beams of scattering and absorption when passing through the hologram layers.

The incident-side reflection-type volume hologram grating 53 is divided into regions and the number of stacked hologram layers or interference fringes laid side by side in each of the hologram layers is varied from one to another as above in order to minimize the distance over which the reproduced light beams are propagated through the hologram medium. Namely, when passing through the hologram layers, the reproduced light beams will be a little influenced by scattering and absorption incurred. The distance reduction aims at suppressing such as influence.

Note that in the aforementioned virtual image display 10, a thin optical device that guides display image light to the viewer's pupil is implemented by the optical waveguide 22, including the first reflection-type volume hologram grating 23 or 53 and the second reflection-type volume hologram grating 24, 34 or 44 and the optical waveguide 22 upon which the group of parallel light beams traveling in difference directions are incident and which allow the light beams to go out after propagated by total reflection through it.

In the optical device and virtual image display having been illustrated and described as the embodiments of the present invention, especially, in the incident-side second reflection-type volume hologram grating, the slant angles of the interference fringes are formed so that the main light beams of different angles of view and central wavelength will meet the Bragg condition, whereby the unevenness of color and brightness due to the angles of view is reduced.

In the optical device and virtual image display as the embodiments of the present invention, the waveband is limited to prevent the color from being uneven due to the continuous variation of the slant angles of the interference fringes.

Further, since the optical device and virtual image display as the embodiments of the present invention form, in a plurality of places, viewable regions which permit a viewer whose lens is low in function of lens adjustment or incurs aberration to have a relatively wide view of an image and clearly recognize a virtual image, and a viewer having a good visual performance to easily observe a virtual image with less fatigue.

The hologram layer 24a of the second reflection-type volume hologram grating 24 of the virtual image display 10 as the embodiment of the present invention will be explained in further detail below with reference to FIG. 14 and on the basis of numerical data in Table 1. It should be noted that the hologram layer 24b is similar to the hologram layer 24a and the first reflection-type volume hologram grating 23 is also similar to the second one except that it is symmetric with the second one with respect to the plane perpendicular to the optical surfaces.

Table 1 shows the distribution of slant angles (in units of 1 deg.) of the interference fringes in positions upon which main light beams of different angles of view are incident when the angle of display is ±10 deg. in the embodiments of the present invention.

TABLE 1

| Angle of view | Angle of view in medium | Total-reflection angle | Slant angle of intra-medium interference fringe (angle formed with hologram angle) | Position in hologram |
|---|---|---|---|---|
| −10 | −6.7 | 41.2 | 24.0 | −3.5 |
| −9 | −6.0 | 42.1 | 24.1 | −3.2 |
| −8 | −5.4 | 43.0 | 24.2 | −2.8 |
| −7 | −4.7 | 43.9 | 24.3 | −2.5 |
| −6 | −4.0 | 44.8 | 24.4 | −2.1 |
| −5 | −3.4 | 45.8 | 24.6 | −1.7 |
| −4 | −2.7 | 46.8 | 24.7 | −1.4 |
| −3 | −2.0 | 47.8 | 24.9 | −1.0 |
| −2 | −1.3 | 48.8 | 25.1 | −0.7 |
| −1 | −0.7 | 49.8 | 25.2 | −0.3 |
| 0 | 0.0 | 50.8 | 25.4 | 0.0 |
| 1 | 0.7 | 51.9 | 25.6 | 0.3 |
| 2 | 1.3 | 53.0 | 25.8 | 0.7 |
| 3 | 2.0 | 54.1 | 26.1 | 1.0 |
| 4 | 2.7 | 55.3 | 26.3 | 1.4 |
| 5 | 3.4 | 56.5 | 26.6 | 1.7 |
| 6 | 4.0 | 57.7 | 26.9 | 2.1 |
| 7 | 4.7 | 59.0 | 27.2 | 2.5 |
| 8 | 5.4 | 60.3 | 27.5 | 2.8 |
| 9 | 6.0 | 61.7 | 27.8 | 3.2 |
| 10 | 6.7 | 63.1 | 28.2 | 3.5 |

The above embodiments adopts, a reference grating, a reflection-type volume hologram grating, in which the optical waveguide 22 is formed from PMMA (of 1.49 in refractive index) and a light beam incident upon the optical waveguide 22 at an angle of −8 deg. is totally reflected in the optical waveguide 22 at an angle of 43 deg.

Figure 14:
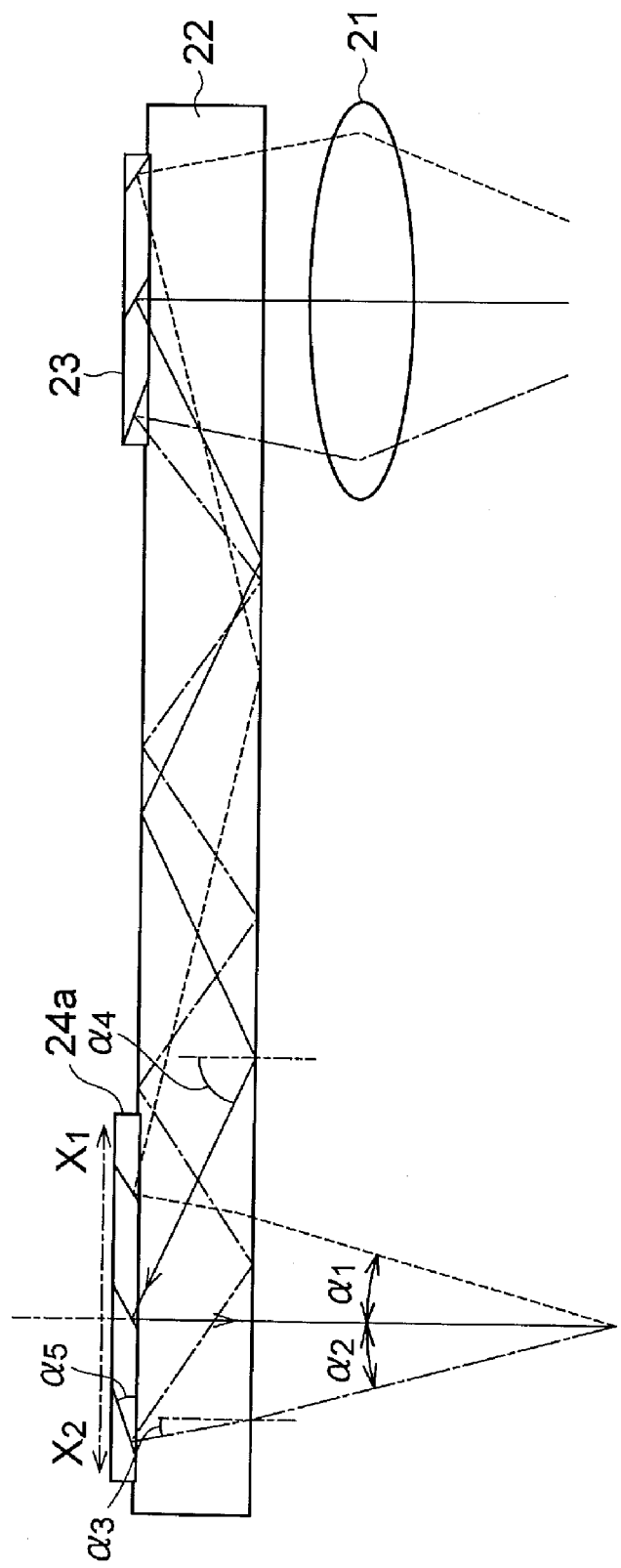
FIG. 14 is a sectional view of a virtual image display as the embodiment of the present invention.

Note that the "Angle of view" in Table 1 refers to the angles of view $\alpha 1$ and $\alpha 2$ shown in FIG. 14. A positive angle of view is indicated with $\alpha 1$ while a negative angle of view is indicated with $\alpha 2$. Also, the "Angle of view in medium" in Table 1 refers to the intra-medium angle of view $\alpha 3$ shown in FIG. 14. The "Total-reflection angle" in Table 1 refers to the total-reflection angle $\alpha 4$ shown in FIG. 14. Further, the "Slant angle of intra-medium interference fringe" in Table 1 refers to the slant angle $\alpha 5$ shown in FIG. 14. The "Position in hologram" in Table 1 is indicated with the distances X1 and X2 from the center line of the hologram shown in FIG. 14.

In the hologram layer 24b included in these embodiments in which slant angles of interference fringes are set as shown in Table 1, the interference fringes of the reflection-type volume hologram optical elements disposed before the viewer's eyes are continuously varied with the on-surface grating pitch being kept fixed for light beams equal in angle of view and having the same wavelength to meet the Bragg condition so that it is possible to equalize the diffraction efficiencies to each other and solve the problem of unevenness of color and brightness at each angle of view as shown in FIG. 8A.

It should be understood by those skilled in the art that various modifications, combinations, sub-combinations and alterations may occur depending on design requirements and other factors insofar as they are within the scope of the appended claims or the equivalents thereof.

What is claimed is:

1. An optical device including an optical waveguide upon which a group of parallel light beams different in traveling direction from each other are incident and from which the group of parallel light beams go out after propagated by repeated total reflection through it, the optical waveguide comprising:

a first reflection-type volume hologram grating to diffract and reflect, in the light beam-incident section thereof, the group of parallel light beams as they are so as to meet internal total reflection condition in the optical wave guide;

a second reflection-type volume hologram grating to diffract and reflect, in a section thereof from which the group of parallel light beams are to go out, the group of parallel light beams as they are so as to go out of the optical waveguide;

a plurality of pitches of interference fringes on the hologram surfaces of the first and second reflection-type volume hologram gratings being equal to each other;

in at least the second reflection-type volume hologram grating, an angle formed between the interference fringes and hologram surfaces being varied continuously or stepwise within the hologram in relation to the main incident light beam so as to meet the Bragg condition; and at least parts of the group of parallel light beams different in traveling direction from each other and propagated from the incident to outgoing section in the optical waveguide by repeated total reflection have different numbers of total reflection respectively depending upon the difference in traveling direction, wherein, in the first reflection-type volume hologram grating, the number of stacked hologram layers or interference fringes laid side by side in each hologram layer is varied in a direction perpendicular to the interference fringes on the surface of the first reflection-type volume hologram grating.

2. The optical device according to claim 1, wherein the pitches of the interference fringes on the hologram surfaces of the first and second reflection-type volume hologram gratings, that diffract the light beams having nearly equal waveband, respectively, are equal to each other.

3. The optical device according to claim 1, wherein the first and second reflection-type volume hologram gratings are disposed parallel with the total reflection surface of the optical waveguide.

4. The optical device according to claim 1, wherein the angle formed between the interference fringe and surface of the second reflection-type volume hologram grating is increased as the second reflection-type volume hologram grating is nearer to the first one.

5. The optical device according to claim 1, wherein the second reflection-type volume hologram grating diffracts and reflects parts of the group of parallel light beams propagated through the optical waveguide more than twice and allows a part of the light amount to go out of the optical waveguide at each diffraction.

6. The optical device according to claim 1, wherein at least one of the first and second reflection-type volume hologram gratings is formed, by stacking, from a plurality of hologram layers that diffract mainly light beams having same incident angle and having different waveband in the same incident position at nearly equal angles, respectively.

7. The optical device according to claim 1, wherein at least one of the first and second reflection-type volume hologram gratings is formed, by side-by-by laying, from a plurality of interference fringes that diffract mainly light beams having same incident angle and having different waveband in the same incident position at nearly equal angles, respectively.

8. The optical device according to claim 1, wherein at least one of the first and second reflection-type volume hologram gratings is formed, by stacking, from a plurality of hologram layers that diffract mainly light beams having equal wavelengths and having different incident angles in the same incident position and diffract light beams having equal in wavelength and incident angle to each other at the same angle.

9. The optical device according to claim 1, wherein at least one of the first and second reflection-type volume hologram gratings is formed, by side-by-side laying, from a plurality of hologram layers that diffract mainly light beams having equal wavelengths and having different incident angles in the same incident position and diffract light beams having equal in wavelength and incident angle to each other at the same angle.

10. The optical device according to claim 1, wherein the second reflection-type volume hologram grating is formed, by stacking, from a plurality of hologram layers having equal interference fringes with the hologram layers being staggered from each other in a direction perpendicular to the interference fringes.

11. The optical device according to claim 1, wherein the second reflection-type volume hologram grating is formed, by side-by-side laying, a plurality of equal interference fringes with the latter being staggered from each other in a direction perpendicular thereto.

12. The optical device according to claim 1, wherein the angle formed between the interference fringe and surface of the first reflection-type volume hologram grating is decreased as the first reflection-type volume hologram grating is nearer to the second one.

13. The optical device according to claim 1, wherein in the first reflection-type volume hologram grating, the number of stacked hologram layers or interference fringes laid side by side in each hologram layer is increased in a direction in which the first reflection-type volume hologram grating is nearer to the second one.

14. A virtual image display, comprising:

a light source;

a collimation optical system to form light beams emitted from the light source into parallel light beams;

a scanning optical system to scan the parallel beams; and an optical waveguide upon which a group of parallel light beams formed in the scanning optical system to travel in different directions are incident and from which the group of parallel light beams go out toward a viewer's pupil after propagated by repeated total reflection through it, wherein, the optical waveguide includes:

a first reflection-type volume hologram grating to diffract and reflect, in the light beams-incident section thereof, the group of parallel light beams as they are at an angle that meets the total reflection condition in the optical waveguide, a second reflection-type volume hologram grating to diffract and reflect, in a section thereof from which the group of parallel light beams are to go out, the group of parallel light beams as they are at an angle at which they go out of the optical waveguide, a plurality of pitches of interference fringes on the hologram surfaces of the first and second reflection-type volume hologram gratings being equal to each other, in at least the second reflection-type volume hologram grating, an angle formed between the interference fringes and hologram surfaces being varied continuously or stepwise within the hologram in relation to the main incident light beam so as to meet the Bragg condition, and at least parts of the group of parallel light beams different in traveling direction from each other and propagated through the optical waveguide by repeated total reflection have different numbers of total reflections, respectively, depending upon the difference in traveling direction, and in the first reflection-type volume hologram grating, the number of stacked hologram layers or interference fringes laid side by side in each hologram layer is varied in a direction perpendicular to the interference fringes on the surface of the first reflection-type volume hologram grating.

15. The virtual image display according to claim 14, wherein a color filter that allows only light beams having a specific wavelength to pass by is provided in the light path from the light source to the viewer's pupil.

16. The virtual image display according to claim 15, wherein the color filter limits the waveband of light beams allowed to be incident upon the second reflection-type volume hologram grating so that the range viewable by the viewer will be less than 2 mm in diameter.

17. The virtual image display according to claim 14, wherein the pitches of the interference fringes on the hologram surfaces of the first and second reflection-type volume hologram gratings, that diffract the light beams having nearly equal waveband, respectively, are equal to each other.

18. The virtual image display according to claim 14, wherein the first and second reflection-type volume hologram gratings are disposed parallel with the total reflection surface of the optical waveguide.

19. The virtual image display according to claim 14, wherein the angle formed between the interference fringe and surface of the second reflection-type volume hologram grating is increased as the second reflection-type volume hologram grating is nearer to the first one.

20. The virtual image display according to claim 14, wherein the second reflection-type volume hologram grating diffracts and reflects parts of the group of parallel light beams propagated through the optical waveguide more than twice and allows a part of the light amount to go out of the optical waveguide at each diffraction.

21. The virtual image display according to claim 14, wherein at least one of the first and second reflection-type volume hologram gratings is formed, by stacking, from a plurality of hologram layers that diffract mainly light beams having same incident angle and having different wavelengths in the same incident position at nearly equal angles, respectively.

22. The virtual image display according to claim 14, wherein at least one of the first and second reflection-type volume hologram gratings is formed, by side-by-by laying, from a plurality of interference fringes that diffract mainly light beams having same incident angle and having different wavelengths in the same incident position at nearly equal angles, respectively.

23. The virtual image display according to claim 14, wherein at least one of the first and second reflection-type volume hologram gratings is formed, by stacking, from a plurality of hologram layers that diffract mainly light beams having equal wavelengths and having same incident angle in the same incident position and diffract light beams having equal in wavelength and incident angle to each other at the same angle.

24. The virtual image display according to claim 14, wherein at least one of the first and second reflection-type volume hologram gratings is formed, by side-by-side laying, from a plurality of hologram layers that diffract mainly light beams having equal wavelengths and having same incident angle in the same incident position and diffract light beams having equal in wavelength and incident angle to each other at the same angle.

25. The virtual image display according to claim 14, wherein the second reflection-type volume hologram grating is formed, by stacking, from a plurality of hologram layers having equal interference fringes with the hologram layers being staggered from each other in a direction perpendicular to the interference fringes.

26. The virtual image display according to claim 14, wherein the second reflection-type volume hologram grating is formed, by side-by-side laying, from a plurality of equal interference fringes with the latter being staggered from each other in a direction perpendicular thereto.

27. The virtual image display according to claim 14, wherein the angle formed between the interference fringe and surface of the first reflection-type volume hologram grating is decreased as the first reflection-type volume hologram grating is nearer to the second one.

28. The virtual image display according to claim 14, wherein in the first reflection-type volume hologram grating, the number of stacked hologram layers or interference fringes laid side by side in each hologram layer is increased in a direction in which the first reflection-type volume hologram grating is nearer to the second one.

* * * * *